US011543838B2

(12) United States Patent
Lee et al.

(10) Patent No.: US 11,543,838 B2
(45) Date of Patent: Jan. 3, 2023

(54) AIR PRESSURE CONTROL DEVICE

(71) Applicant: SEMES CO., LTD., Chungcheongnam-do (KR)

(72) Inventors: Chung Woo Lee, Suwon-si (KR); In Kyu Park, Gunpo-si (KR); Yong Seok Jang, Cheonan-si (KR); Sung Youn Jeon, Cheonan-si (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 0 days.

(21) Appl. No.: 17/401,463

(22) Filed: Aug. 13, 2021

(65) Prior Publication Data
US 2022/0050483 A1 Feb. 17, 2022

(30) Foreign Application Priority Data

Aug. 14, 2020 (KR) .................. 10-2020-0102682

(51) Int. Cl.
*G05D 16/20* (2006.01)
*G05B 19/042* (2006.01)
*H02P 8/40* (2006.01)
*H02P 21/18* (2016.01)

(52) U.S. Cl.
CPC ......... *G05D 16/202* (2013.01); *G05B 19/042* (2013.01); *H02P 8/40* (2013.01); *H02P 21/18* (2016.02); *G05B 2219/2614* (2013.01)

(58) Field of Classification Search
CPC .............. G05D 16/202; G05B 19/042; G05B 2219/41326; H02P 8/40; H02P 21/18; H02P 6/16; H02P 8/12; F04B 45/047; F04B 49/22; F04B 53/10
See application file for complete search history.

(56) References Cited

U.S. PATENT DOCUMENTS

| 2004/0159354 | A1* | 8/2004 | Cederstav | ............ G05D 16/202 |
| | | | | 137/487.5 |
| 2009/0301579 | A1* | 12/2009 | Wong | ...................... F16K 51/02 |
| | | | | 137/565.13 |
| 2013/0203259 | A1* | 8/2013 | Winniczek | ........ H01J 37/32834 |
| | | | | 438/758 |

FOREIGN PATENT DOCUMENTS

| JP | 2016-106253 A | 6/2016 |
| JP | 2017-192200 A | 10/2017 |
| KR | 101990995 B1 | 9/2019 |
| KR | 10-2020-0044685 A | 4/2020 |

OTHER PUBLICATIONS

Korean Patent Office, Office action dated Sep. 15, 2022.

* cited by examiner

*Primary Examiner* — Michael W Choi
(74) *Attorney, Agent, or Firm* — Li & Cai Intellectual Property (USA) Office

(57) ABSTRACT

Disclosed is an air pressure control (APC) device according to an embodiment of the inventive concept. The air pressure control (APC) device may include a processing chamber, a plate for adjusting a pressure in the processing chamber, and an APC valve including first and second step motors for adjusting a height of the plate, and an APC controller that controls the APC valve, and the APC controller may include a first controller that controls positions of the first step motor and the second step motor; and a second controller that compensates for a difference in position between the first step motor and the second step motor.

12 Claims, 7 Drawing Sheets

(a)

(b)

(a)

(b)

(a)

(b)

(a)

(b)

AIR PRESSURE CONTROL DEVICE

CROSS-REFERENCE TO RELATED APPLICATIONS

A claim for priority under 35 U.S.C. § 119 is made to Korean Patent Application No. 10-2020-0102682 filed on Aug. 14, 2020, in the Korean Intellectual Property Office, the entire contents of which are hereby incorporated by reference.

BACKGROUND

The inventive concept relates to an air pressure control (APC) device and an APC method. More particularly, the inventive concept relates to a method of controlling a motor to adjust the height of a plate for adjusting a pressure in a chamber.

FIG. 1 is a view for describing a pressure control structure using conventional APC (Air Pressure Control).

According to the conventional APC structure as shown in FIG. 1, a plate, which adjusts a pressure in a chamber, is provided to have a structure that is partially movable while being fixed on one side, so that the chamber pressure needs to be adjusted only through an open area as shown in (b) of FIG. 1, resulting in an imbalance in the chamber, and causing a problem that the efficiency is lowered because the area of the open area is smaller than the area of the plate.

Accordingly, as shown in FIG. 4, a pressure control structure using air pressure control (APC) according to the inventive concept is disclosed. In the case of FIG. 4, there is disclosed an APC system capable of adjusting a position of a plate 20 up and down according to the driving of two step motors 31 and 32. In this case, it is possible to perform control to discharge a pressure in a uniform direction by driving a lift pins 32a disposed between the step motors 31 and 32 and the plate 20. Referring to (b) of FIG. 4, in this example, an open area is provided in a size corresponding to the area of the plate 20, so that pressure control may be performed more efficiently than in the case of FIG. 1.

However, in the case of the embodiment of FIG. 4, a problem occurred in a method for controlling a plurality of step motors.

FIGS. 2 to 3 are diagrams for describing a conventional step motor control method.

A method for controlling a dependent structure-type step motor is described with reference to FIG. 2.

Referring to FIG. 2, in the case of the method for controlling a dependent structure-type step motor, an output from one controller is simultaneously supplied to two step motors to drive the two step motors in a synchronous manner. In such a control method, there is a problem in that there is no way to perform compensation when at least one of the two step motors operates abnormally because it is vulnerable to external factors.

A method for controlling an independent structure-type step motor is described with reference to FIG. 3.

Referring to FIG. 3, in the case of the method for controlling an independent structure-type step motor, there is an advantage in that the final positions of two step motors are at the same position by using two position controllers individually, but positions during the operation of two step motors may be different from each other due to the difference in characteristics of step motors. In this case, a change in a target position needs to be minimized in order to minimize the difference in position between the two step motors during the operation of the motors, which causes a problem of slowing the response speed of an entire valve.

That is, in the case of the conventional method for controlling step motors in a synchronous manner, control is performed in a dependent structure or an independent structure. However, in both structures, there is a problem in that there is no way to compensate for an error in the positions of the two step motors.

SUMMARY

Embodiments of the inventive concept provide a step motor control method in which synchronization is easily achieved.

Embodiments of the inventive concept provide a control method capable of easily compensating for an error even when the error occurs due to a difference in position between a plurality of step motors.

The problem to be solved by the inventive concept is not limited to the above-mentioned problems, and the problems not mentioned will be clearly understood by those of ordinary skill in the art to which the inventive concept belongs from the present specification and the accompanying drawings.

Disclosed is an air pressure control (APC) device according to an embodiment of the inventive concept.

The air pressure control (APC) device may include a processing chamber, a plate for adjusting a pressure in the processing chamber, an APC valve including first and second step motors for adjusting a height of the plate, and an APC controller that controls the APC valve.

According to an embodiment, the APC controller may include a first controller that controls positions of the first step motor and the second step motor; and a second controller that compensates for a difference in position between the first step motor and the second step motor.

According to an embodiment, the first controller may calculate target positions of the first step motor and the second step motor based on the pressure in the processing chamber, calculate current positions of the first step motor and the second step motor, and apply a signal for controlling positions of the first step motor and the second step motor by a difference between the target positions and the current positions.

According to an embodiment, the first controller may apply a signal for controlling the position of the first step motor by a difference between the target position and the current position of the first step motor, to the first step motor when the current positions of the first step motor and the second step motor are different from each other.

According to an embodiment, the second controller may calculate an error between a position of the first step motor and a position of the second step motor, which have been changed according to the signal from the first controller and apply a signal for additionally controlling the second step motor by a magnitude corresponding to the error.

According to an embodiment, the first controller may control the first step motor and the second step motor through a closed loop for comparing the target position and the current position of the first step motor, and the second controller may control the second step motor through an open loop for comparing the position of the first step motor and the position of the second step motor.

According to an embodiment, the APC device may further include a first encoder connected to the first step motor, and a second encoder connected to the second step motor.

According to an embodiment, the second controller may be a PID controller.

According to another embodiment of the inventive concept, there is disclosed an air pressure control (APC) device.

The APC device includes a processing chamber, a plate for adjusting a pressure in the processing chamber, an APC valve including first and second step motors for adjusting a height of the plate, and an APC controller that controls the APC valve. The APC controller may calculate target positions of the first step motor and the second step motor based on the pressure in the processing chamber, calculate a first position of the first step motor and a second position of the second step motor, primarily control positions of the first step motor and the second step motor based on difference information between the target position and the first position, and compensate for an error between the first position and the second position which have been changed according to a result of the control based on the difference information and additionally control the second step motor based on the compensated difference information.

According to an embodiment, the first position may be a current position of the first step motor, and the second position may be a current position of the second step motor.

According to still another embodiment, there is disclosed a method for controlling a first step motor and a second step motor to adjust a height of a plate for controlling a pressure in a chamber.

The method may include measuring a current pressure in the chamber, calculating target positions of the first step motor and the second step motor based on the pressure in the chamber, calculating current positions of the first step motor and the second step motor, controlling the first step motor and the second step motor based on a difference between the target position and the current position of the first step motor, and additionally controlling the second step motor by compensating for an error between a position of the second step motor and a position of the first step motor.

According to an embodiment, the controlling of the first step motor and the second step motor based on the difference between the target position and the current position of the first step motor may be a closed loop control.

According to an embodiment, the additionally controlling of the second step motor by compensating for the error between the position of the second step motor and the position of the first step motor may be an open loop control.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
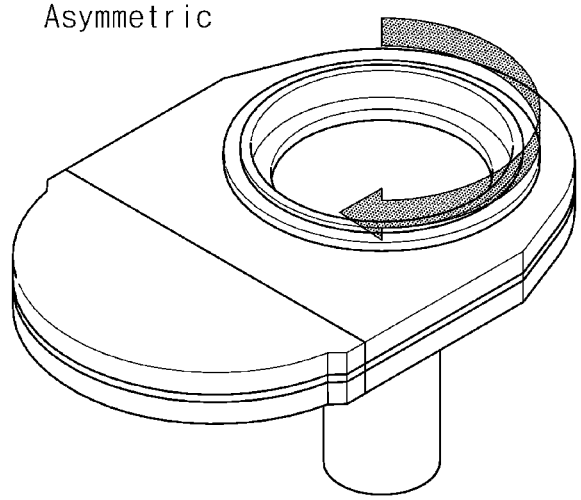
FIG. 1 is a diagram for describing an existing APC structure.
Figure 1:
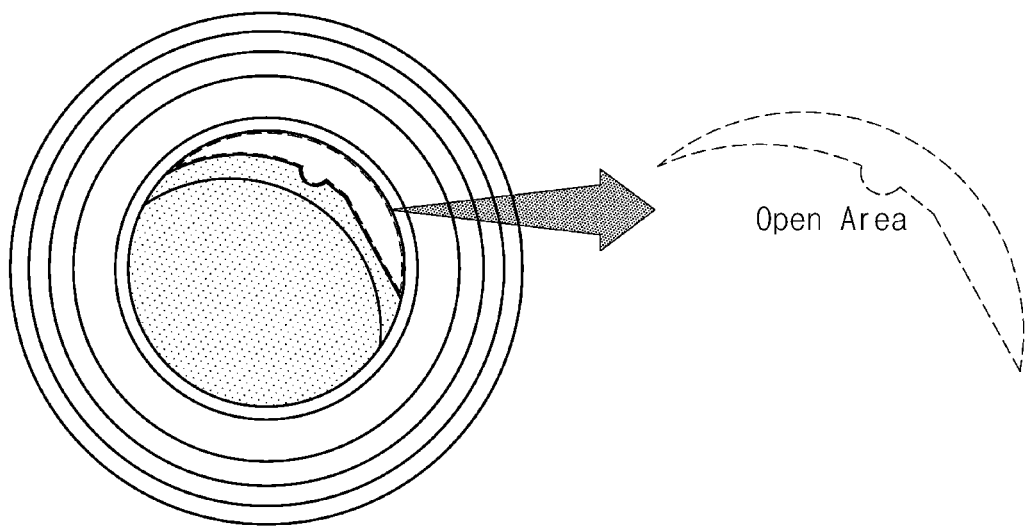
Figure 2:
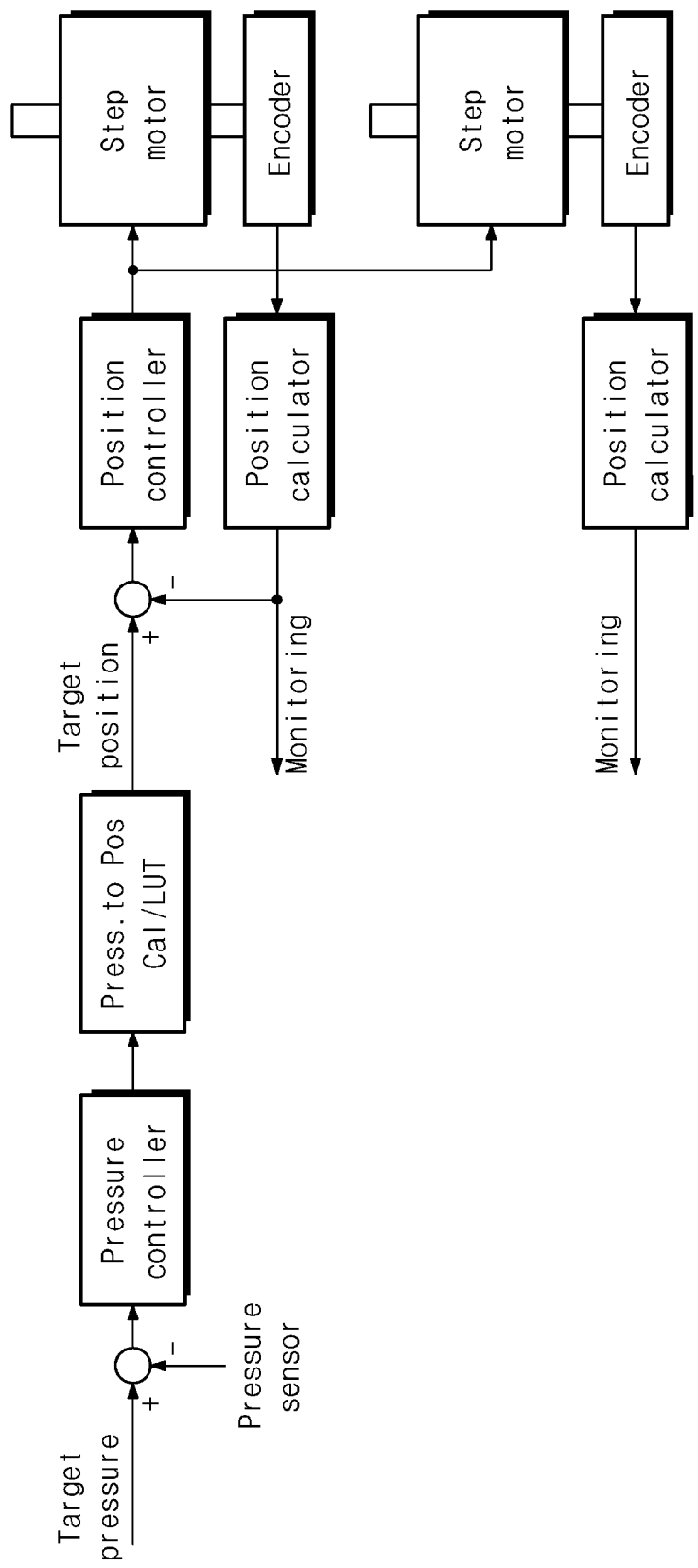
FIGS. 2 to 3 are diagrams for describing a conventional step motor control method.
Figure 3:
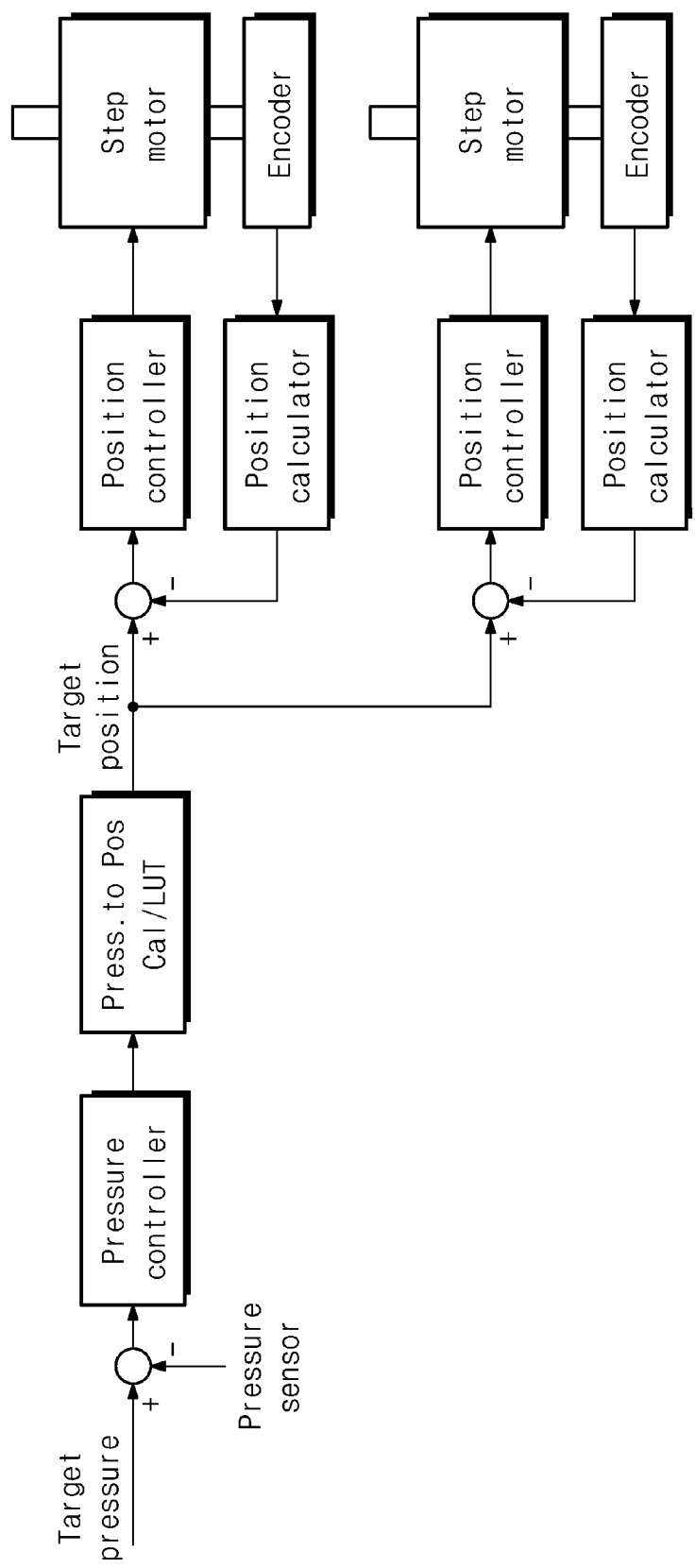
Figure 4:
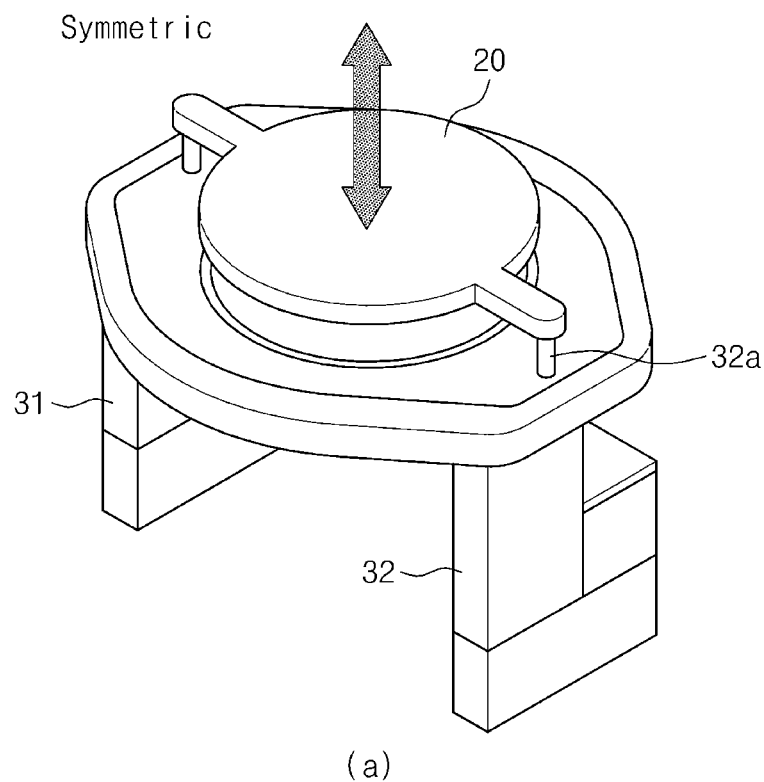
FIG. 4 is a diagram for describing an APC structure according to the inventive concept.
Figure 4:
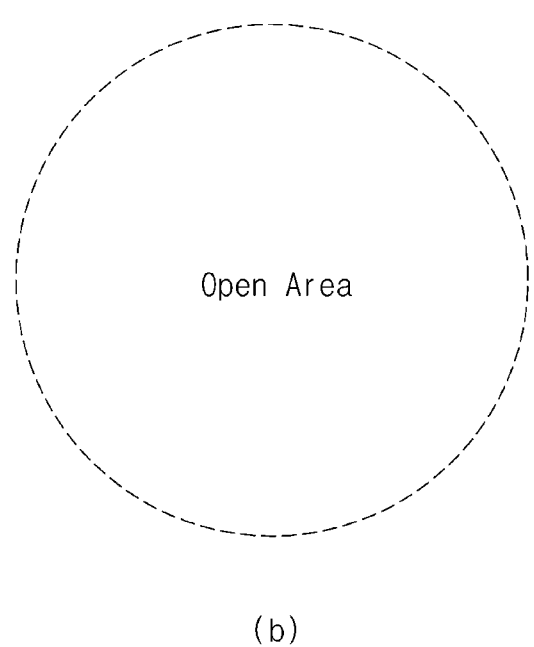

Advantages and features of the inventive concept and methods for achieving them will be apparent with reference to embodiments described below in detail in conjunction with the accompanying drawings. However, the inventive concept is not limited to the embodiments disclosed below, but can be implemented in various forms, and these embodiments are to make the disclosure of the inventive concept complete, and are provided so that the inventive concept will be thorough and complete and will fully convey the scope of the invention to those of ordinary skill in the art, which is to be defined only by the scope of the claims.

Unless defined herein, all terms (including technical or scientific terms) used herein have the same meaning as commonly accepted by general technology in the prior art to which the inventive concept belongs. It will be further understood that terms, such as those defined in commonly used dictionaries, should be interpreted as having a meaning that is consistent with their meaning in the context of the relevant art and/or the description of the inventive concept and will not be interpreted in an idealized or overly formal sense unless expressly so defined herein.

Terms such as first, second, or the like may be used to describe various elements, but the elements should not be limited by the terms. The terms are used merely for the purpose to distinguish a component from the other component. For example, without departing the scope of the disclosure, a first component may be referred to as a second component, and similarly, a second component may be referred to as a first component.

As used herein, singular forms may include plural forms as well unless the context clearly indicates otherwise. In addition, shapes, sizes, and the like of elements in the drawings may be exaggerated for clearer description.

The terminology used herein is for the purpose of describing particular embodiments only and is not intended to be limiting of the inventive concept. The singular expressions include plural expressions unless the context clearly dictates otherwise. In this specification, the term "comprises" and/or the various conjugations of this term, "include", "comprising", "having" are intended to specify the presence of stated features, integers, steps, operations, elements, parts or combinations thereof, but do not preclude the presence or addition of steps, operations, elements, parts, or combinations thereof. As used herein, the term 'and/or' refers to each of the listed components or various combinations thereof.

As used throughout this specification, '~ unit' is a unit that processes at least one function or operation, and may refer to, for example, a software component or a hardware component such as FPGA or ASIC. However, '~ unit' is not meant to be limited to software or hardware. '~ unit' may be configured to reside in an addressable storage medium or may be configured to reproduce one or more processors.

As an example, '~ unit' may include components such as software components, object-oriented software components, class components and task components, processes, functions, properties, procedures, sub-routines, segments of program codes, drivers, firmware, microcodes, circuitry, data, databases, data structures, tables, arrays, and variables. A function provided by a component and '~ unit' may be performed separately by a plurality of components and '~ unit', or may be integrated with other additional components.

The inventive concept provides a method for synchronizing and controlling two step motors mounted on a valve for air pressure control (APC) in an etcher system. In an APC device according to the inventive concept, there is an effect in which two step motors are controlled in a synchronous manner by adding a controller for compensating for a difference in position between the two step motors for synchronous control of the two step motors. The inventive concept proposes a device and method for compensating for a difference in position between two step motors by adding a controller for compensating the position of an dependent step motor with a difference in position between the dependent-type step motor and a main step motor based on the control method for dependent structure-type step motors according to the prior art.

Figure 5:
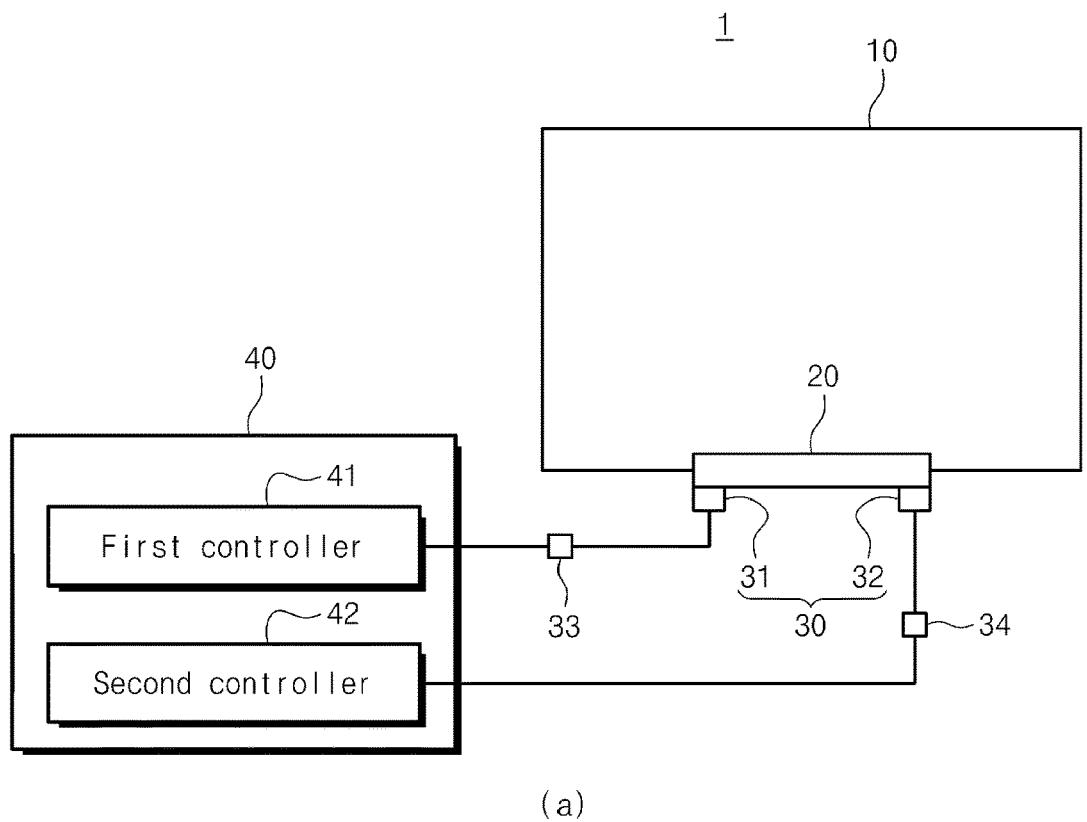
FIG. 5 is a diagram illustrating an example of an APC device according to the inventive concept.
Figure 5:
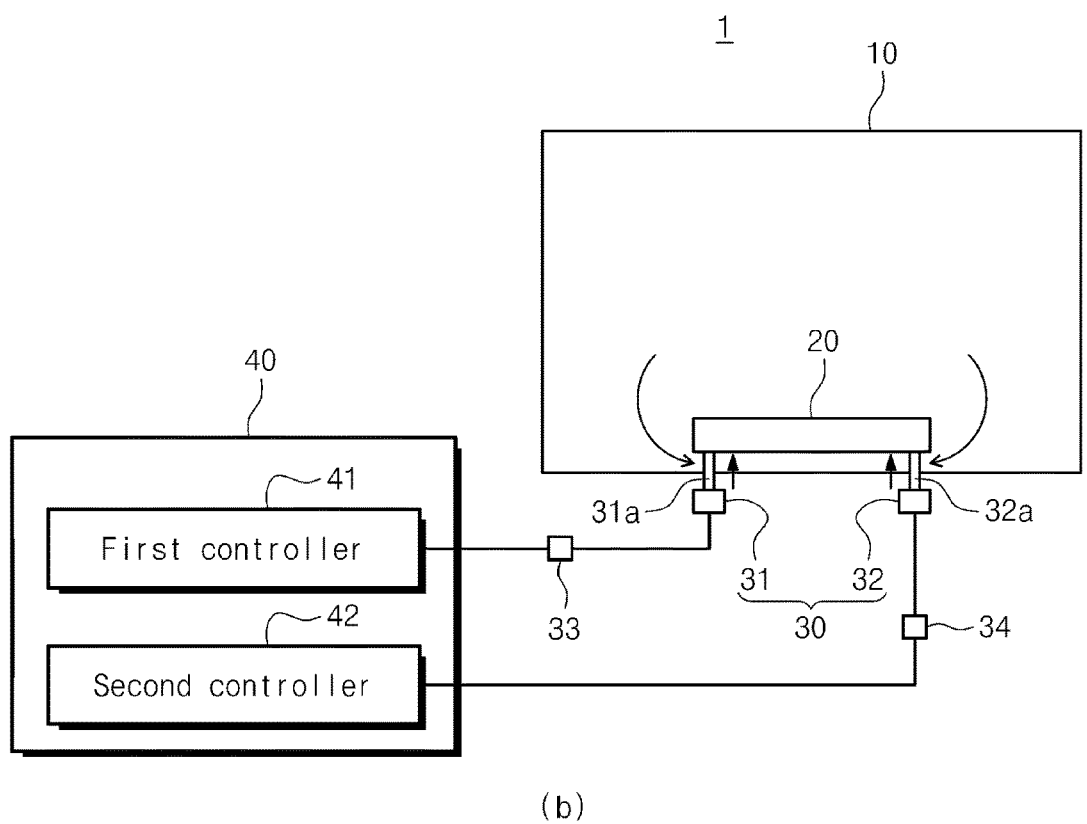

FIG. 5 is a diagram showing an example of an air pressure control (APC) device 1 according to the inventive concept.

According to FIG. 5, the APC device 1 according to the inventive concept may include a processing chamber 10, the plate 20, an APC valve 30, and an APC controller 40.

In the processing chamber 10, various processing may be performed on a substrate. According to an embodiment, in the processing chamber 10, various processes such as cleaning, deposition, coating, and photolithography processes may be performed on the substrate.

The plate 20 may define a part of a lower wall of the chamber 10. According to an embodiment, the plate 20 may be provided in a circular shape. The plate 20 may be moved up and down by driving the step motors 31 and 32 disposed under the plate 20. When the plate 20 is raised to the top through the step motors 31 and 32, air in the chamber 10 is discharged through a gap formed between the plate 20 and the lower wall of the chamber 10, thus making it possible to adjust a pressure in the chamber 10 easily.

According to (b) of FIG. 5, an embodiment of adjusting a pressure of the chamber 10 by adjusting the height of the plate 20 is illustrated. The APC valve 30 including the first step motor 31 and the second step motor 32 may be disposed under the plate 20. According to the embodiment, lift pins 31a and 32a may be formed between the first step motor 31 and the plate 20 and between the second step motor 32 and the plate 20, respectively, thus controlling the heights of the lift pins 31a and 32a using the step motors 31 and 32. Accordingly, the pressure in the chamber may be controlled.

The APC valve 30 may include the first step motor 31 and the second step motor 32. The APC valve 30 may be a valve connected to a plate. The APC valve 30 may include the lift pins 31a and 32a therein to control opening and closing of the valve 30 according to the heights of the lift pins 31a and 32a. However, this is only an example, and it is also possible to control the opening and closing of the valve 30 in another manner The APC controller 40 may include a first controller 41 and a second controller 42. The first controller 41 may control the positions of the first step motor 31 and the second step motor 32. The second controller 42 may compensate for a difference in position between the first step motor 31 and the second step motor 32.

The first controller 41 may calculate target positions of the first step motor 31 and the second step motor 32 based on a current pressure of the processing chamber 10. Thereafter, the current positions of the first step motor 31 and the second step motor 32 may be calculated. The first controller 41 may apply a signal for controlling the positions of the first step motor 31 and the second step motor 32 by differences between the target positions and the current positions. When the current positions of the first step motor 31 and the second step motor 32 are different from each other, a signal for controlling the position of the first step motor 31 by a difference between the current position and target position of the first step motor 31 may be applied. That is, the processing may be performed on the first step motor 31 as the main control object.

The second controller 42 may calculate an error between the position of the first step motor 31 and the position of the second step motor 32 which have been changed according to the signal from the first controller 41 and apply a signal for additionally controlling the second step motor 32 by a magnitude corresponding to the error. Through this, even if a position difference occurs, compensation control may be performed in real time.

According to an embodiment, the first controller 41 may control the first step motor 31 and the second step motor 32 through a closed loop for comparing the target position and current position of the first step motor 31. According to an embodiment, the second controller 42 may control the second step motor 32 through an open loop for comparing the position of the first step motor 31 and the position of the second step motor 32.

The APC device 1 may further include a first encoder 33 connected to the first step motor 31 and a second encoder 34 connected to the second step motor 32. Data of the first step motor 31 may be encoded using the first encoder 33. Data of the second step motor 32 may be encoded using the second encoder 34. Data encoded using the first encoder 33 and the second encoder 34 may be input to the APC controller 40.

According to an embodiment, the second controller 42 may be a PID controller. Gain conditions may be adjusted by using the PID controller. However, as the second controller 42 compensating for the position difference, various controllers such as PD and PI may be used in addition to PID.

Hereinafter, a step motor control method using the APC device 1 according to FIG. 5 will be described in more detail.

Figure 6:
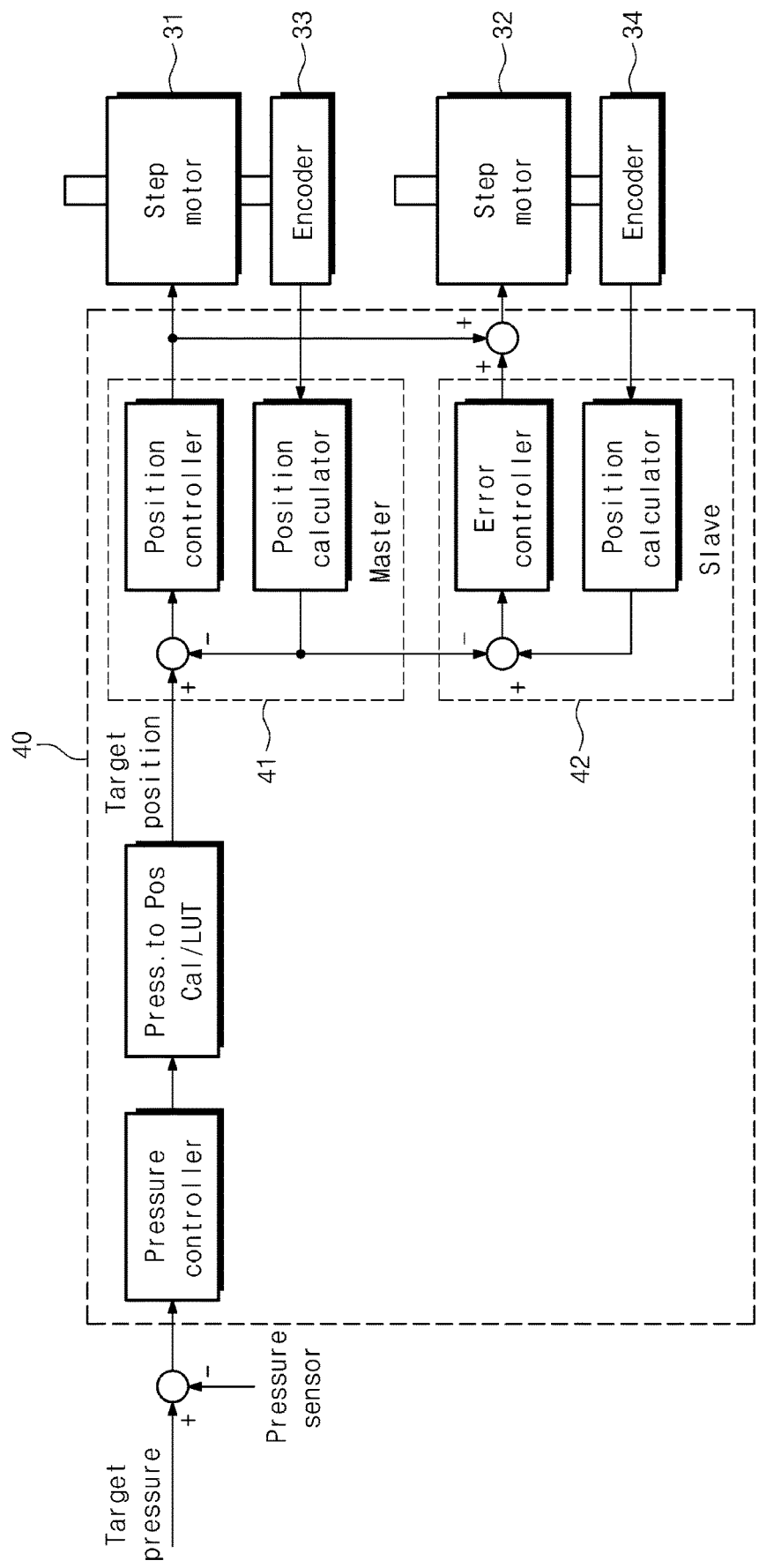
FIG. 6 is a diagram for describing a step motor control method in the APC device according to an embodiment of the inventive concept.

FIG. 6 is a view for describing a step motor control method in the APC device 1 according to an embodiment of the inventive concept.

According to FIG. 6, the APC controller 40 according to the inventive concept may include the first controller 41 and the second controller 42. The first controller 41 may be a controller that controls the positions of the two step motors 31 and 32. The second controller 42 may be a controller that compensates for a difference in position between the two step motors 31 and 32. According to one embodiment, the first controller 41 that controls a position of a motor may perform position control using an encoder signal of the first step motor 31 as a main controller and supply a control command of the first step motor 31 to the first step motor 31 and the second step motor 32.

The second controller 42 that compensates for a difference in position between the two motors may receive the position information of the first step motor 31 and the second step motor 32 and add a control input in which a difference therebetween is compensated, and a motor control command received from the first controller 41 to supply a result of the addition to the second step motor 32.

The inventive concept may minimize the position difference between the two motors even while a position of the motor is changing by additionally providing the controller 42 for compensating for the difference in position between the first step motor 31 and the second step motor 32.

An embodiment is provided as following. It is assumed that a target position is 10, and the current position of the two step motors is 0. In this case, the first controller 41 may apply a signal to the first step motor 31 and the second step motor 32 to allow the first step motor 31 and the second step motor 32 to move by 10, which is the difference between the target position and the current position.

The first step motor 31 and the second step motor 32 may drive the lift pins disposed under the plate 20 to move by 10 according to the applied signal. However, the moving distances of the first step motor 31 and the second step motor 32 may be different due to various causes such as a performance difference or external factors. According to an embodiment, it is assumed that the position by the lift pin of the first step motor 31 moved by the first controller 41 is 10, and the position by the lift pin of the second step motor 32 is 9. In this case, the second controller 42 may receive data of the step motors from the first encoder 33 connected to the first step motor 31 and the second encoder 34 connected to the second step motor 32 and calculate a difference therebetween. The second controller 42 may calculate an error between the position of the first step motor 31 and the position of the second step motor 32. According to the above, the calculated difference may be 1. The second controller 42 may apply a compensation signal to the second step motor 32 to compensate for the difference between the position of the first step motor 31 and the position of the second step motor 32. Accordingly, there is an effect that the first step motor 31 and the second step motor 32 may be controlled in real time in a synchronous manner.

Figure 7:
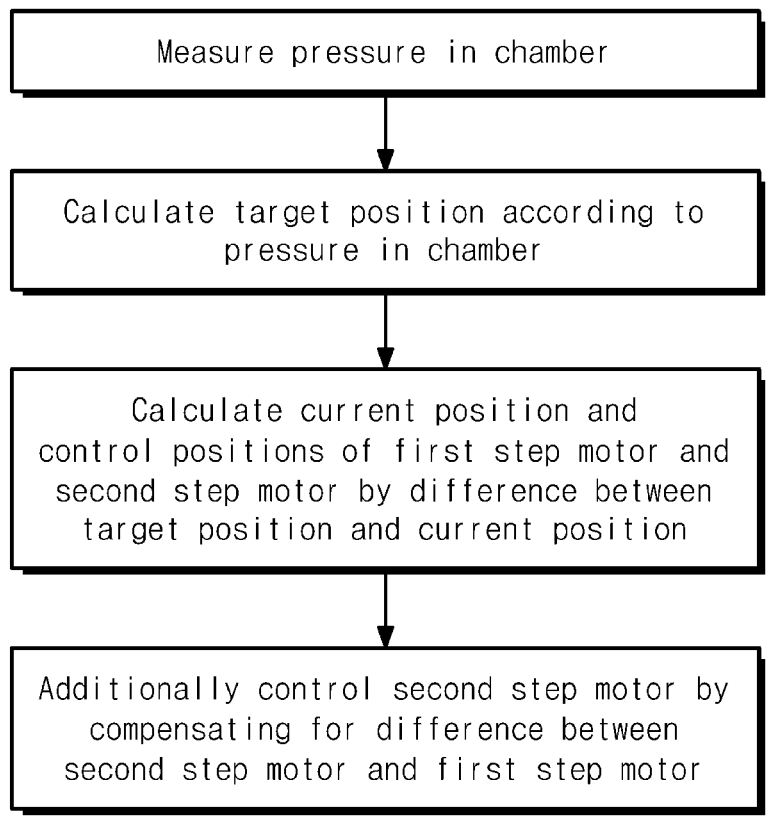
FIG. 7 is a flowchart of an APC method according to the inventive concept.

FIG. 7 is a flowchart of an APC method according to the inventive concept.

Referring to FIG. 7, a current pressure in a chamber may be measured according to the inventive concept. When there is a need to adjust the current pressure in the chamber, target positions of the first step motor 31 and the second step motor 32 may be calculated according to the pressure in the chamber. According to an embodiment, it is possible to calculate a target position of the plate 20 to reach the target pressure according to a current pressure in the chamber and a target pressure and, through this, the target positions of the first step motor 31 and the second step motor 32 may be set respectively. The target positions of the first step motor 31 and the second step motor 32 may be identical to each other. When the target position is set, a current position of the first step motor 31 may be calculated. The first controller 41 may calculate a difference between the target position and current position of the first step motor 31, and apply a signal capable of driving a motor by the difference to the first step motor 31 and the second step motor 32. Even when the same signal is applied, the final position of the first step motor 31 and the final position of the second step motor 32 may be different depending on an external factor or the like. In this case, the second controller 42 may calculate a difference value between the final position of the first step motor 31 and the final position of the second step motor 32 and apply a signal to the second step motor 32 to drive the second step motor 32 by the difference. Through this, there is an effect in which synchronization between the first step motor 31 and the second step motor 32 is achieved.

Although an embodiment in which only two step motors are provided is disclosed in the inventive concept, an embodiment including three or more step motors may be possible. According to an embodiment, when pressure control is performed using a total of three step motors, real-time synchronous control may be performed in a manner that the first step motor is the main control target, and the second step motor and the third step motor compensate for a difference from the first step motor through compensation controllers. In this case, it is possible to compensate for a difference in position between the third step motor and the first step motor through a third controller.

The above embodiments are presented to help the understanding of the inventive concept, and do not limit the scope of the inventive concept, and it should be understood that various modified embodiments therefrom also fall within the scope of the inventive concept. The drawings provided in the inventive concept merely show an optimal embodiment of the inventive concept. It should be understood that the technical protection scope of the inventive concept should be determined by the technical idea of the claims, and the technical protection scope of the inventive concept is not limited to the literal description of the claims itself, but extends to substantially equivalent to the technical value.

According to the embodiments of the inventive concept, even when an error occurs due to a difference in position between a plurality of step motors, it is possible to easily compensate for the error, and to archive synchronization easily.

The effects of inventive concept is not limited to the above-mentioned effects, and the effects not mentioned will be clearly understood by those of ordinary skill in the art to which the inventive concept belongs from the present specification and the accompanying drawings.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An air pressure control (APC) device comprising:
a processing chamber;
a plate configured to adjust a pressure in the processing chamber;
an APC valve including first and second step motors for adjusting a height of the plate; and
an APC controller configured to control the APC valve, wherein the APC controller includes
a first controller configured to control positions of the first step motor and the second step motor; and
a second controller configured to compensate for a difference in position between the first step motor and the second step motor.

2. The APC device of claim 1, wherein the first controller is configured to:
calculate target positions of the first step motor and the second step motor based on the pressure in the processing chamber,
calculate current positions of the first step motor and the second step motor, and
apply a signal for controlling positions of the first step motor and the second step motor by a difference between the target positions and the current positions.

3. The APC device of claim 2, wherein the first controller is configured to,
when the current positions of the first step motor and the second step motor are different from each other,
apply a signal for controlling the position of the first step motor by a difference between the target position and the current position of the first step motor, to the first step motor.

4. The APC device of claim 3, wherein the second controller is configured to calculate an error between a position of the first step motor and a position of the second step motor which have been changed according to the signal from the first controller and apply a signal for additionally controlling the second step motor by a magnitude corresponding to the error.

5. The APC device of claim 4, wherein the first controller controls the first step motor and the second step motor through a closed loop for comparing the target position and the current position of the first step motor, and
wherein the second controller controls the second step motor through an open loop for comparing the position of the first step motor and the position of the second step motor.

6. The APC device of claim 5, wherein the APC device further comprises:
a first encoder connected to the first step motor; and
a second encoder connected to the second step motor.

7. The APC device of claim 6, wherein the second controller is a PID controller.

8. An air pressure control (APC) device comprising:
a processing chamber;
a plate configured to adjust a pressure in the processing chamber;
an APC valve including first and second step motors for adjusting a height of the plate; and
an APC controller configured to control the APC valve, wherein the APC controller is configured to:
calculate target positions of the first step motor and the second step motor based on the pressure in the processing chamber,
calculate a first position of the first step motor and a second position of the second step motor,
primarily control positions of the first step motor and the second step motor based on difference information between the target position and the first position, and
compensate for an error between the first position and the second position which have been changed according to a result of the control based on the difference information and additionally control the second step motor based on the compensated difference information.

9. The APC device of claim 8, wherein the first position is a current position of the first step motor, and
wherein the second position is a current position of the second step motor.

10. The APC device of claim 9, wherein the APC controller is configured to:
control the first step motor through a closed loop for comparing the target position and the current position, and
control the second step motor through an open loop for comparing the first position and the second position.

11. The APC device of claim 10, wherein the APC device further comprises:
a first encoder connected to the first step motor; and
a second encoder connected to the second step motor.

12. The APC device of claim 11, wherein the APC controller includes a PID controller.

\* \* \* \* \*